(12) United States Patent
Sorosiak et al.

(10) Patent No.: US 12,169,039 B2
(45) Date of Patent: Dec. 17, 2024

(54) TAMPER-RESISTANT HYDRAULIC CONNECTIONS

(71) Applicants: ThyssenKrupp Bilstein of America Inc., Hamilton, OH (US); thyssenkrupp AG, Essen (DE)

(72) Inventors: Eric Sorosiak, Liberty Township, OH (US); William Delaney, Indianapolis, IN (US)

(73) Assignees: ThyssenKrupp Bilstein of America Inc., Hamilton, OH (US); thyssenkrupp AG, Essen (DE)

( * ) Notice: Subject to any disclaimer, the term of this patent is extended or adjusted under 35 U.S.C. 154(b) by 0 days.

(21) Appl. No.: 18/102,186

(22) Filed: Jan. 27, 2023

(65) Prior Publication Data
US 2024/0255085 A1    Aug. 1, 2024

(51) Int. Cl.
*F16L 37/252*    (2006.01)

(52) U.S. Cl.
CPC .................................. *F16L 37/252* (2013.01)

(58) Field of Classification Search
CPC ...... F16L 37/252; F16L 37/244; F16L 37/248
USPC .......................................................... 285/402
See application file for complete search history.

(56) References Cited

U.S. PATENT DOCUMENTS

| | | | | | |
|---|---|---|---|---|---|
| 266,359 | A | * | 10/1882 | Gotzel .................. | F16L 37/252 285/376 |
| 692,795 | A | * | 2/1902 | Moyle .................. | F16L 37/252 285/361 |
| 789,541 | A | * | 5/1905 | Hayes .................. | F16L 37/252 285/376 |
| 794,539 | A | * | 7/1905 | O'Brien ................ | F16L 19/005 285/376 |
| 2,421,228 | A | * | 5/1947 | White .................. | F16L 37/248 285/361 |
| 3,538,950 | A | * | 11/1970 | Porteners .............. | F16L 37/252 285/376 |
| 3,858,910 | A | * | 1/1975 | Oetiker ................ | F16L 37/252 285/376 |
| 4,280,723 | A | * | 7/1981 | Moldestad ............ | F16L 37/113 285/376 |
| 4,477,109 | A | * | 10/1984 | Kleuver ................ | F16L 37/48 285/376 |

(Continued)

*Primary Examiner* — David Bochna
(74) *Attorney, Agent, or Firm* — hyssenkrupp North America, LLC

(57) ABSTRACT

A tamper-resistant hydraulic connection may include a fitting that has a flange, a head, and a central body disposed between the flange and the head. The head may have lobes that protrude radially relative to the central body. The fitting may be inserted into a port where a fluid-tight connection is formed. A central opening of the port includes pockets where the lobes of the head are retained, with the pockets preventing rotation and longitudinal retreat of the lobes. An elastic member disposed on the fitting may be compressed longitudinally between the flange of the fitting and the port. The fitting and the port may be sized and shaped such that assembly of the tamper-resistant hydraulic connection requires pushing the head into the central opening longitudinally past a first radially-extending plane where the pockets are located, rotating the head, and moving the head longitudinally back into the first radially-extending plane.

6 Claims, 12 Drawing Sheets

(56) References Cited

U.S. PATENT DOCUMENTS

| | | | | |
|---|---|---|---|---|
| 5,249,958 A | * | 10/1993 | Freber | F23D 14/46 |
| | | | | 431/278 |
| 5,466,020 A | * | 11/1995 | Page | F16L 37/252 |
| | | | | 285/376 |
| 6,108,865 A | * | 8/2000 | Veser | E01H 1/0827 |
| | | | | 285/402 |
| 10,576,575 B2 | * | 3/2020 | Jogdand | B23K 9/32 |
| 2005/0079010 A1 | * | 4/2005 | Droppleman | F16L 37/252 |
| | | | | 403/348 |
| 2007/0236018 A1 | * | 10/2007 | Husmann | F16L 37/252 |
| | | | | 285/391 |
| 2008/0185842 A1 | * | 8/2008 | Blackman | F16L 37/252 |
| | | | | 285/376 |
| 2022/0381386 A1 | * | 12/2022 | Larsen | F16L 37/252 |

* cited by examiner

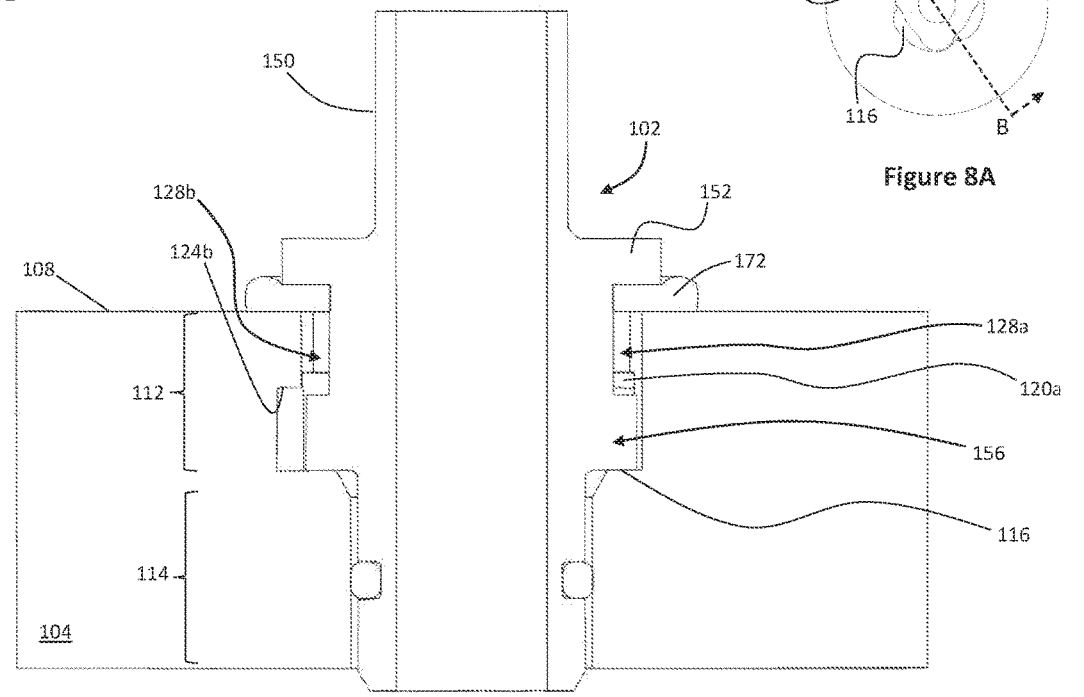

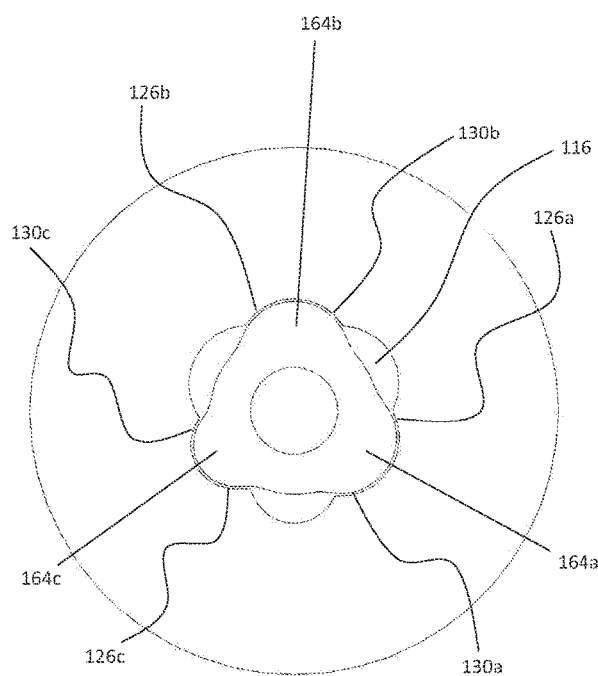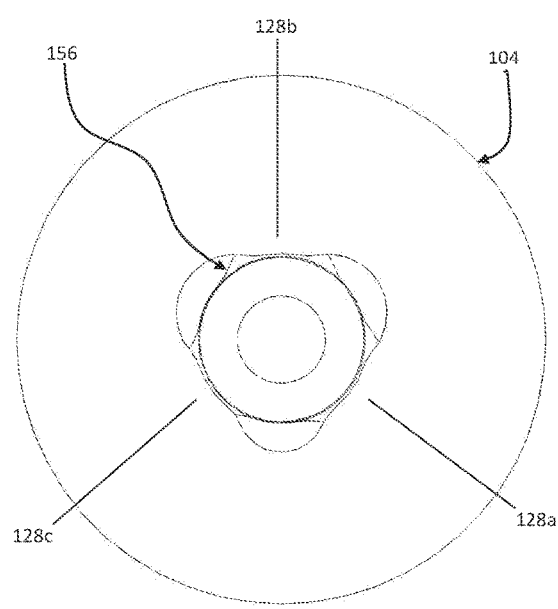
Figure 11                                    Figure 12

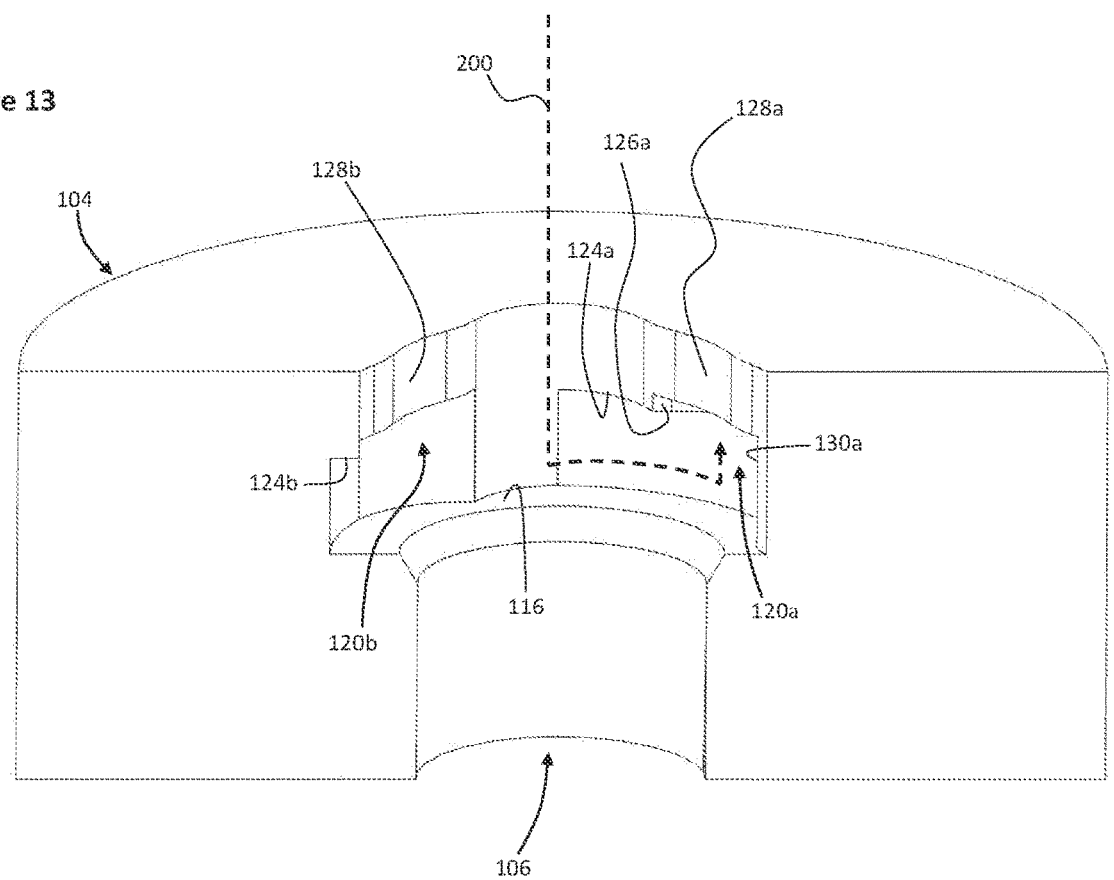

TAMPER-RESISTANT HYDRAULIC CONNECTIONS

FIELD

The present disclosure generally pertains to hydraulic connections, including tamper-resistant hydraulic connections in motor vehicles.

BACKGROUND

Many hydraulic connections utilize common hydraulic fittings that have hexagonal fastening means that can be manipulated with standard wrenches. One such example is a vehicle shock absorber that is connected to an external gas reservoir via a hose. Where common hydraulic fittings are employed, there is a risk that an end user may attempt to disconnect the common hydraulic fittings out of curiosity or to service or modify an associated part. Loosening such common hydraulic fittings can cause irreversible fluid and pressure loss, especially in certain hydraulic components such as a vehicle shock absorber, for instance. Depressurizing hydraulic components can negatively affect performance and even impair basic functionality. Further, evidence of such tampering may not be present, and such tampering can result in unjustified and costly warranty claims.

SUMMARY

A tamper-resistant, fluid-tight hydraulic connection may be formed between a fitting and a port. The fitting and the port of the hydraulic connection are free of wrench flats. The fitting may include a passage that extends longitudinally for transmitting hydraulic fluid, a flange, a head that is longitudinally spaced apart from the flange, and a central body disposed longitudinally between the head and the flange. The head may include a lobe that protrudes or projects radially relative to the central body and/or other parts of the fitting. In some cases, two or three or more lobes may be utilized on the head. The port may include a first side where access to a first portion of the central opening is located. The central opening extends longitudinally and is also configured to transmit hydraulic fluid. A shoulder located between the first portion and a second portion of the central opening may prevent the head of the fitting from moving farther into the central opening than is intended. Pockets of the central opening may retain the lobes of the head within the central opening. The pockets prevent the lobes and thus the head from rotating and retreating from the central opening.

An elastic member can be disposed on the fitting, in some cases just beneath the flange. When the tamper-resistant hydraulic connection is in an assembled state, the elastic member may be compressed longitudinally between the flange of the fitting and some part of the port, such as the first side of the port, for example. In many cases, a cross-sectional profile of the central opening at the first side of the port matches a cross-sectional profile of the head of the fitting. Thus, if the head and its lobes have a generally triangular shape, the central opening too may have a generally triangular shape at the first side. In one example, a first of the lobes has a different profile than a second and a third of the lobes such that the fitting can only be inserted into the central opening of the port at one angular position relative to the port. Still further, in some cases a cross-sectional profile of the head matches a cross-sectional profile across only part of a longitudinal extent of the first portion of the central opening.

Once assembled, the lobes of the head may be longitudinally spaced apart from the shoulder. Conversely, in some instances the lobes must contact the shoulder for assembly or disassembly of the hydraulic connection. The fitting and the port may be sized and shaped such that for assembly and disassembly each lobe must rotate and pass longitudinally-between the shoulder and a radially-extending planar surface of the central opening. Each radially-extending planar surface may be longitudinally spaced apart from an overhang of each pocket that prevents the head from retreating from the central opening of the port. Each overhang may extend radially inward relative to each pocket, and each overhang may be disposed longitudinally-adjacent to the first side of the port or longitudinally-between the shoulder and the first side of the port. In some examples, each radially-extending planar surface abuts a stop that forms a side of each pocket and prevents the respective lobe from rotating in one direction. A sidewall of each pocket may prevent rotation of each lobe in another direction.

In some cases, the fitting and the port are sized and shaped such that the elastic member is compressed to a first extent during assembly and to a second extent when the tamper-resistant hydraulic connection is fully assembled. The first extent of compression may be greater than the second extent of compression. Consequently, the elastic member in combination with hydraulic pressure retain the lobes longitudinally in the pockets. In other words, even if an end user were aware of the hydraulic connection, disassembling the hydraulic connection is not easy because not only must the elastic member be compressed, but hydraulic pressure present in an associated hydraulic system must also be overcome.

The flange, the central body, and the head may in some instances be disposed longitudinally between a first tubular portion and a second tubular portion of the fitting. The head may be configured to be inserted into the first portion of the central opening where the head of the fitting is ultimately retained, and the second tubular portion of the fitting may be configured to be inserted farther, into the second portion of the central opening. The first tubular portion may be configured to be attached to a hose that transmits hydraulic fluid.

The fitting and the port may be sized and shaped such that the head rotates in a first radially-extending plane within the central opening. The fitting and the port are sized and shaped such that the head is retained within the pockets in the central opening at a second radially-extending plane that is longitudinally spaced apart from the first radially-extending plane. Thus, the fitting and the port may be sized and shaped such that assembly of the tamper-resistant hydraulic connection requires pushing the head into the central opening longitudinally past the second radially-extending plane, rotating the head in the first radially-extending plane between 30 to 50 degrees, for example, and moving the head longitudinally back into the second radially-extending plane. In some examples, the second radially-extending plane may be the only plane within the central opening at which the head may be rotated.

BRIEF DESCRIPTION OF THE DRAWINGS

FIG. 8A is a top sectional view of the tamper-resistant hydraulic connection showing the head of the fitting disposed within the port in a second step in the sequence whereby the fitting is secured to the port.

FIG. 8B is a cross-sectional view of the tamper-resistant hydraulic connection illustrating the second step in the sequence whereby the fitting is secured to the port, with the cross-section being taken across line B-B in FIG. 8A.

FIG. 11 is a cross-sectional view of the tamper-resistant hydraulic connection taken across line D-D in FIG. 10.

FIG. 12 is a cross-sectional view of the tamper-resistant hydraulic connection taken across line E-E in FIG. 10.

FIG. 13 is a perspective, cutaway view of the example port showing a path of a lobe of the head of the fitting during connection of the fitting to the port.

DETAILED DESCRIPTION

Although certain example methods and apparatuses are described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art. With respect to the drawings, it should be understood that not all components are drawn to scale. Furthermore, those having ordinary skill in the art will understand that the various examples disclosed herein should not be considered in isolation. Rather, those with ordinary skill in the art will readily understand that the disclosure relating to some examples may be combined with and/or equally applicable to the disclosure relating to other examples.

Figure 1:
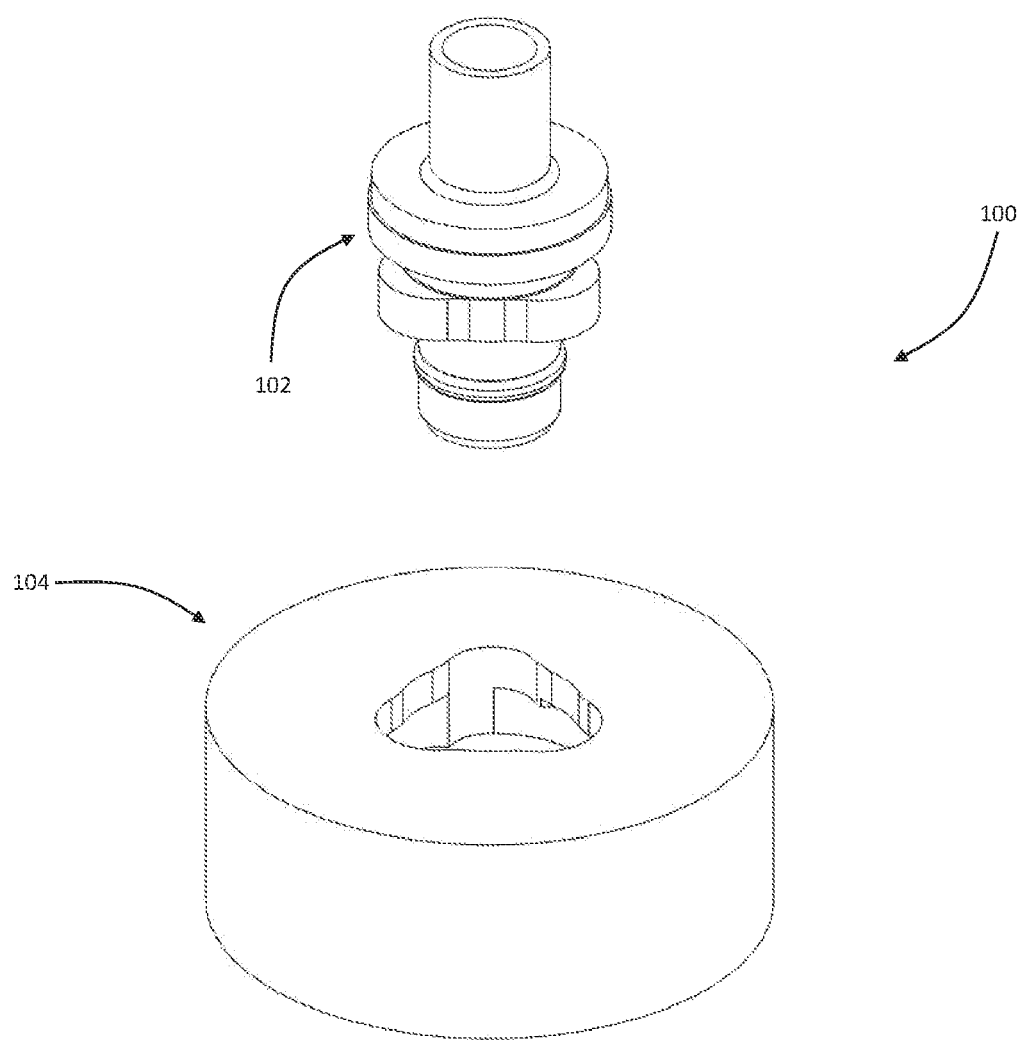
FIG. 1 is an exploded view of an example tamper-resistant hydraulic connection.
Figure 2:
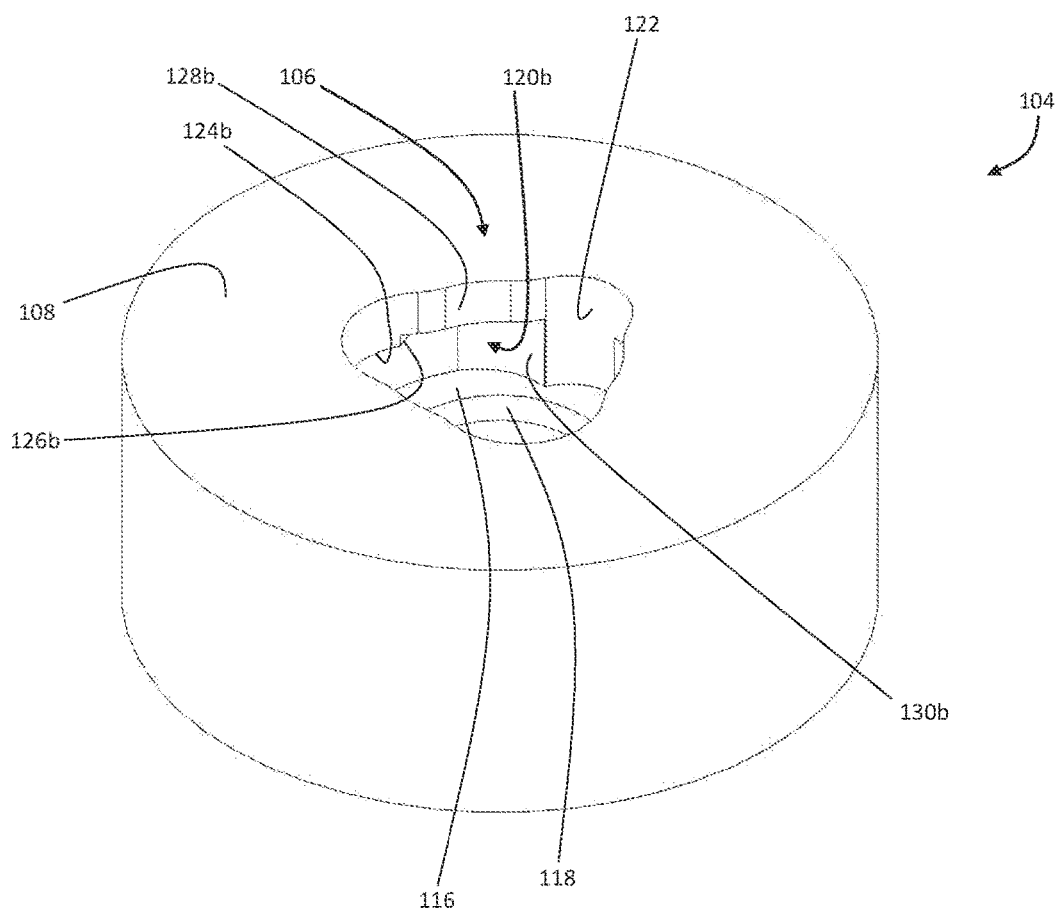
FIG. 2 is a perspective view of an example port of the tamper-resistant hydraulic connection of FIG. 1.
Figure 3:
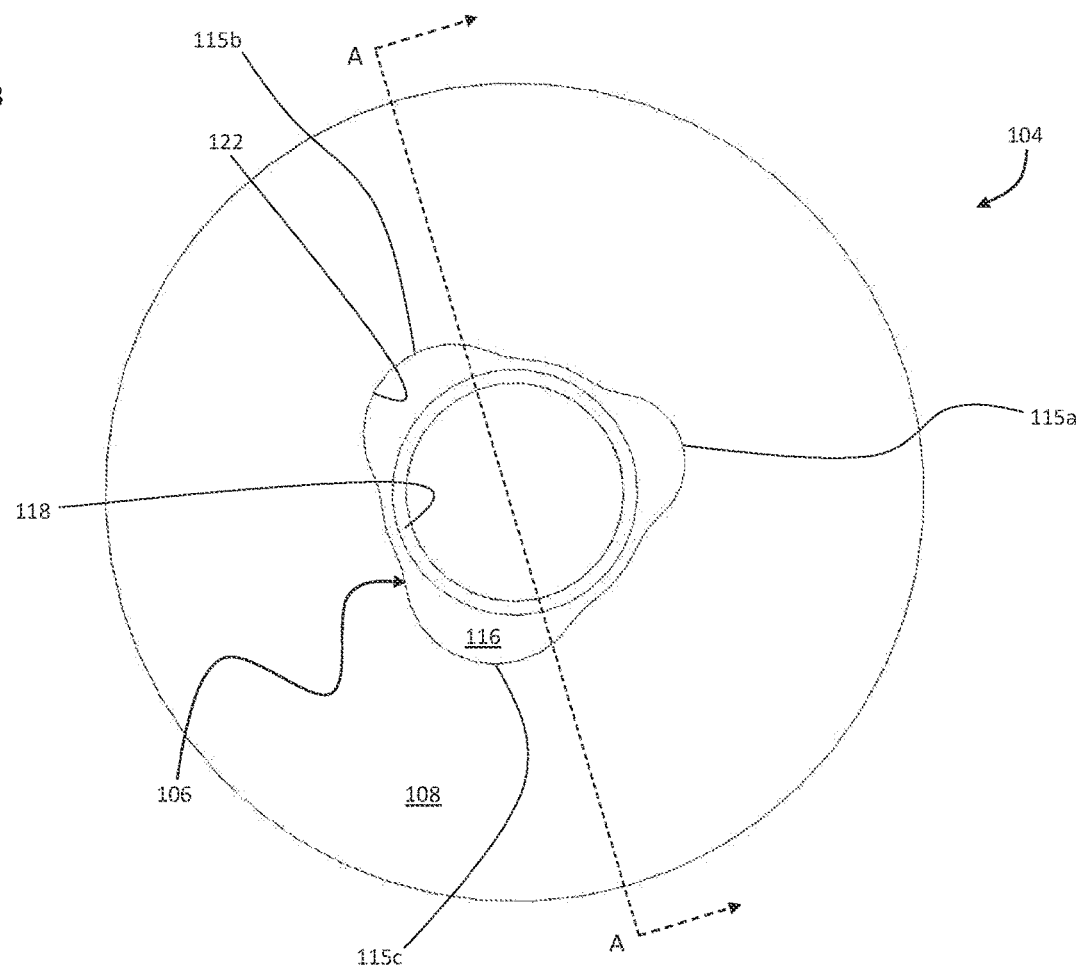
FIG. 3 is a top view of the port of FIG. 2.
Figure 4:
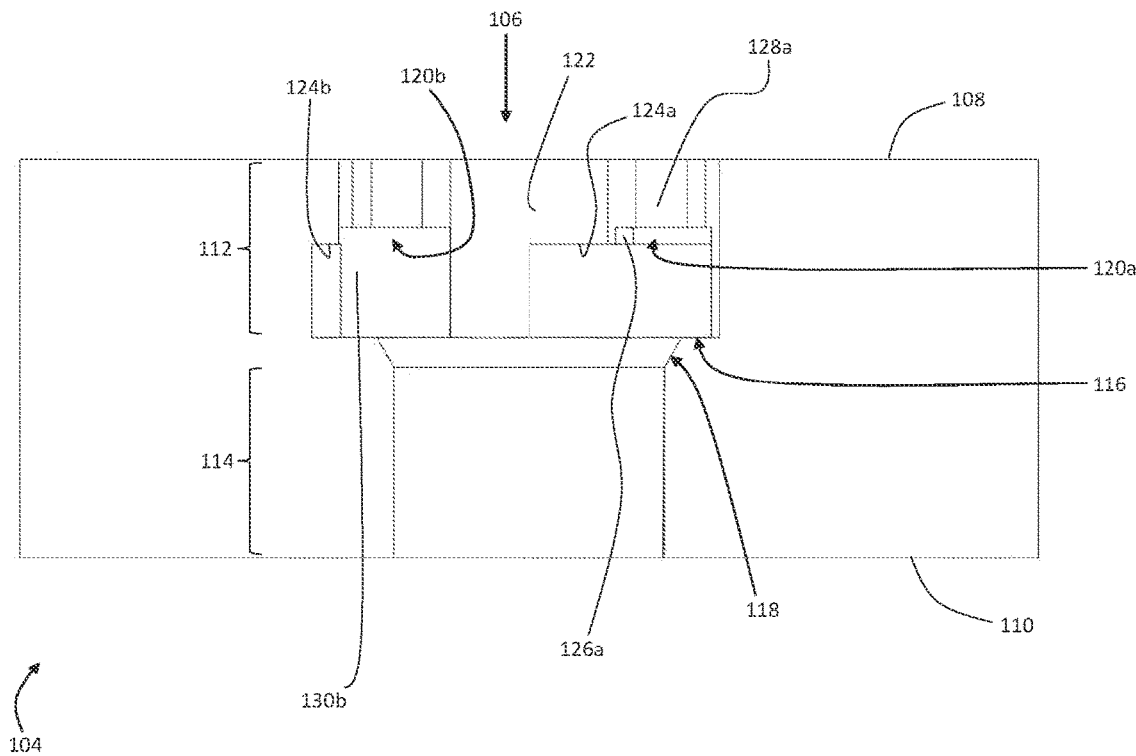
FIG. 4 is a cross-sectional view of the port of FIGS. 2 and 3 taken across the line AA in FIG. 3.
Figure 5:
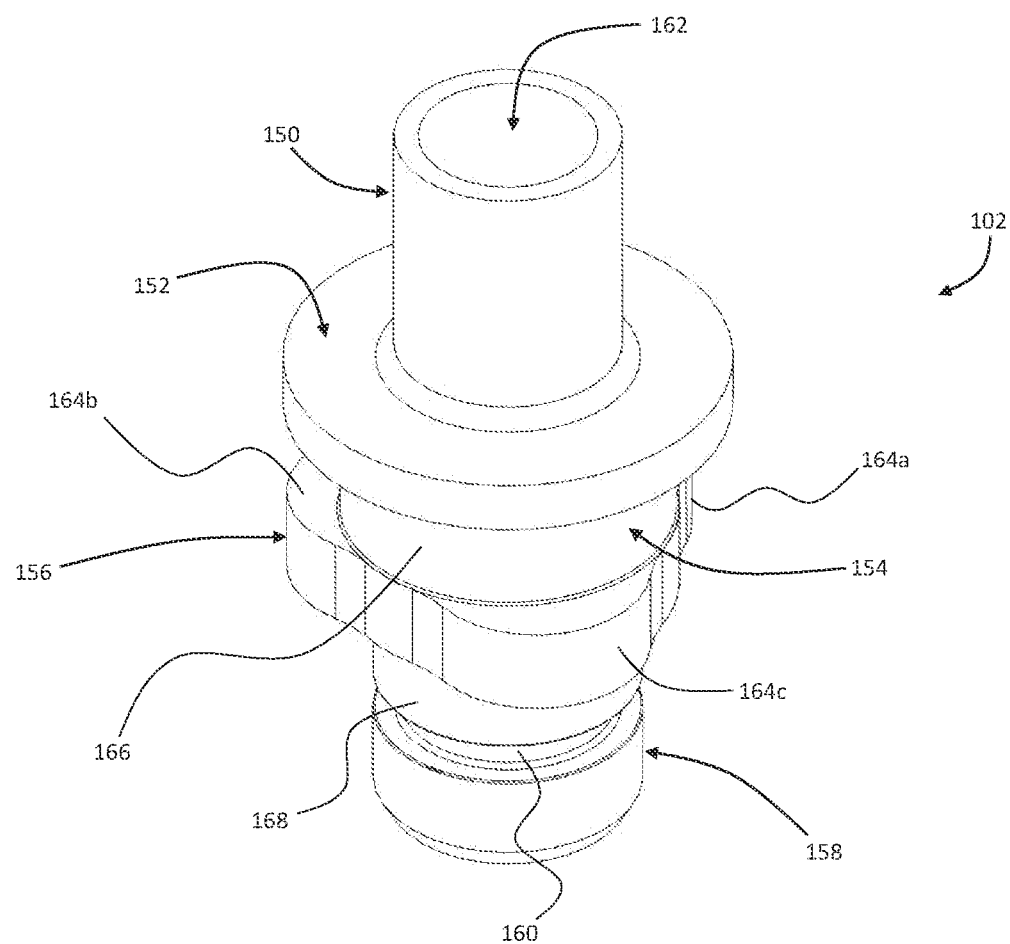
FIG. 5 is a perspective view of an example fitting of the tamper-resistant hydraulic connection of FIG. 1.
Figure 6:
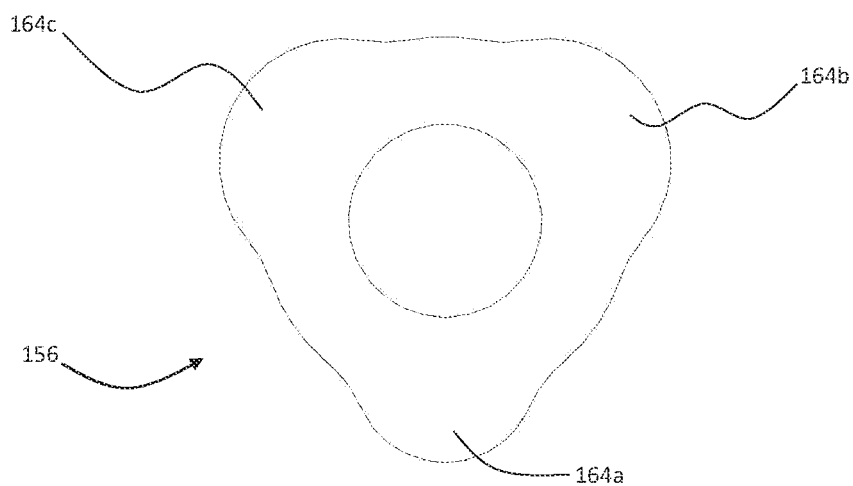
FIG. 6 is a top view of a head of the fitting of FIG. 5.

FIG. 1 shows an example hydraulic connection 100 that is tamper resistant. The hydraulic connection 100 generally includes a fitting 102 and a port 104. The port 104 is configured to receive and secure the fitting 102 in a fluid-tight manner. FIGS. 2-4 show the example port 104 in more detail, whereas FIGS. 5 and 6 show the example fitting 102 in more detail.

With reference now to FIGS. 2-4, the example port 104 is shown in the shape of a puck. However, those having ordinary skill in the art will appreciate that the port 104 can be embodied in a multitude of ways, such as a standalone part that is attached to another component or as a feature that is incorporated into and/or integral with a larger component. For example, the port 104 could be disposed in an axial end cap of a shock absorber or a cylindrical sidewall of an external reservoir tube. In other words, the shape of the example port 104 is shown primarily for exemplary purposes.

Notwithstanding, the port 104 in this example has a central opening 106 that is sized, shaped, and generally configured to receive the fitting 102. For purposes of transmitting hydraulic fluid, the central opening 106 may extend axially or longitudinally from a first side 108 of the port 104 to a second side 110 of the port 104. The central opening 106 may have a rounded, triangular cross-sectional shape at the first side 108 of the port 104 where the fitting 102 is received and may have a cylindrical cross-sectional shape at the second side 110 of the port 104. It should be understood that in other examples, the central opening 106 may have different cross-sectional shapes at the first and second sides 108, 110. For example, depending on the construction of the fitting, the central opening at the first side where the fitting is received may have a star shape, a cross shape, a rectangular shape, an elliptical shape, a square shape, or a pentagonal shape in other cases.

The central opening 106, which extends longitudinally through the port 104, may generally include two distinct longitudinally-extending portions: a first portion 112 that is closer to the first side 108 of the port 104 and is configured to receive part of the fitting 102, and a second portion 114 that is closer to the second side 110 of the port 104. In this example, the first portion 112 of the central opening 106 has a generally triangular cross section, and the second portion 114 of the central opening 106 has a cylindrical cross section. The generally-triangular, cross-sectional shape of the first portion 112 of the central opening 106 may be regarded as having a first lobe recess 115a, a second lobe recess 115b, and a third lobe recess 115c. A shoulder 116 is disposed at a "bottom" of the first portion 112 or, in other words, at a longitudinal extent of the first portion 112 that is farthest from the first side 108 of the port 104. The central opening 106 may also include a chamfer 118 between the first and second portions 112, 114, longitudinally adjacent to the shoulder 116.

Still further, the central opening 106 in this example includes three pockets 120a, 120b, only two of which can be seen in FIGS. 2-4. The pockets 120 may be configured, at least in terms of size and shape, to receive and retain certain portions of the fitting 102, as will be explained in greater detail below. The pockets 120 are recessed in both a radial direction and in a longitudinal direction. For example, the pockets 120a, 120b are recessed radially relative to a remainder 122 of the generally-triangular, cross-sectional shape of the first portion 112 of the central opening 106. Likewise, the pocket 120a is recessed longitudinally relative to a radially-extending planar surface 124a of the first portion 112 of the central opening 106, and the pocket 120b is recessed longitudinally relative to a radially-extending planar surface 124b of the first portion 112 of the central opening 106. More specifically, as will be appreciated further below, each pocket 120 such as the pocket 120*b* shown in FIG. 2 may be defined by a stop 126*b*, an overhang 128*b*, and a sidewall 130*b*.

Turning now to FIG. 5, the example fitting 102 includes a first tubular portion 150 that is configured for connection to a hose, a flange 152, a central body 154, a head 156, and a second tubular portion 158 with a circumferentially extending channel 160 configured to receive an O-ring or other sealing member. A passage 162 may extend longitudinally through these components for the transmission of hydraulic fluid. Further, in some examples, various components of the fitting 102 may be integrally connected (e.g., as a forged part), such as the first tubular portion 150, the flange 152, the central body 154, the second tubular portion 158, and even the head 156. In other examples, however, certain components such as the head 156 and the central body 154 may be attached (e.g., by welds or interference fits) to other components such as the first and second tubular portions 150, 158 and the flange 152. Although not depicted, it should be understood that the first tubular portion 150 may have features such as barbs or circumferential recesses, for instance, that facilitate a fluid-tight connection to a hose, crimp ring, and/or other hydraulic fluid-transmitting conduits or accessories.

The central body 154, the head 156, and the second tubular portion 158 may be configured for insertion into the central opening 106 of the port 104. The head 156 may have a larger cross-section than the central body 154 such that no portion of the central body 154 protrudes radially beyond the head 156. However, the head 156 in this example includes three lobes 164*a*, 164*b*, 164*c* that protrude radially beyond an outer cylindrical surface 166 of the central body 154. Likewise, the lobes 164*a*, 164*b*, 164*c* protrude radially beyond an outer cylindrical surface 168 of the second tubular portion 158.

FIG. 6 shows a top view of only the head of the fitting 102. In some examples, one or more of the lobes 164 may be radiused differently than the other lobes 164. Here, the first lobe 164*a* has a slightly smaller radius than do the second and third lobes 164*b*, 164*c*. Consequently, the head 156 and thus the fitting 102 may be inserted at only one angular position in the central opening 106 of the port 104. Such features may be particularly advantageous in scenarios where there is a need to orient the fitting 102 at a particular angular position relative to the port 104, or vice versa, such as where the component that is coupled to the first tubular portion 150 of the fitting 102 is an elbow, for example. Configuring the head 156 in this manner eliminates the possibility of misorienting the fitting 102 relative to the port 104.

Figure 7:
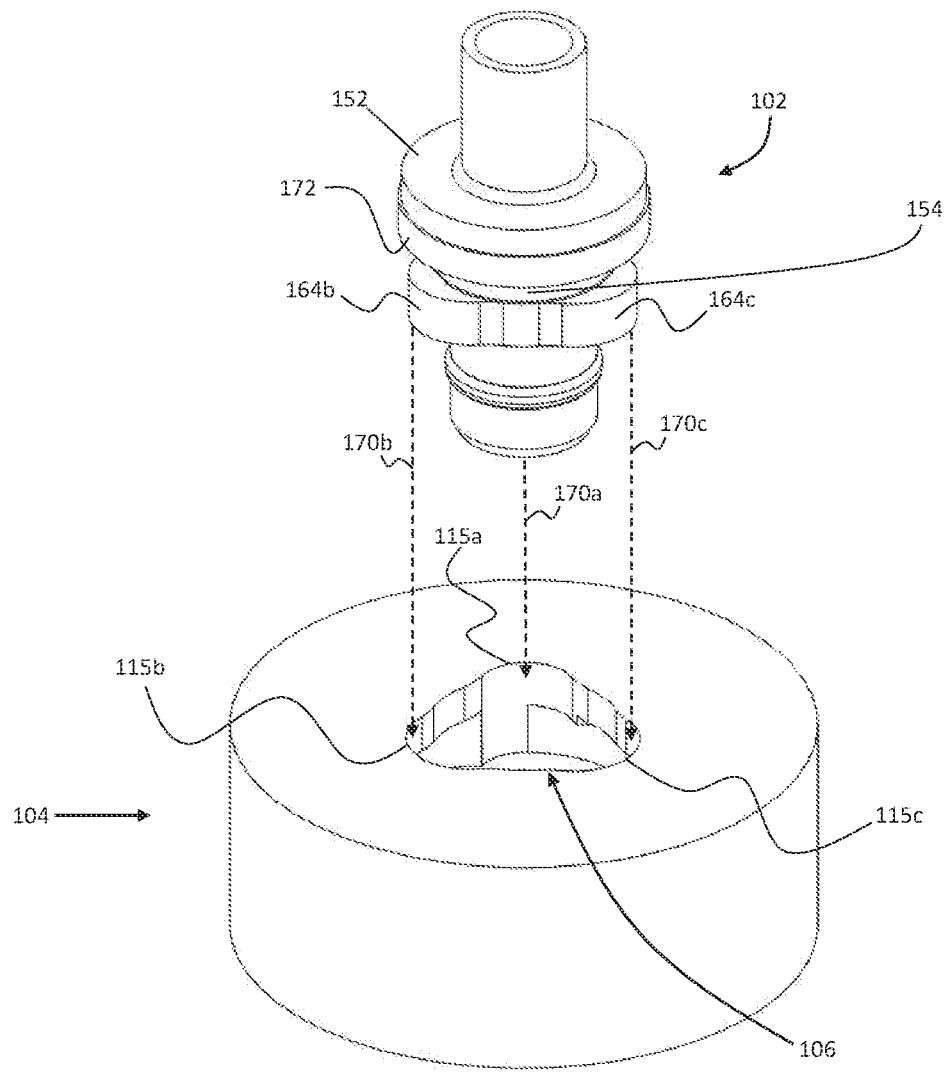
FIG. 7 is a perspective view of the tamper-resistant hydraulic connection of FIG. 1 illustrating a first step in a sequence whereby the fitting is secured to the port.

FIGS. 7-10 show a sequence by which the fitting 102 is inserted into the central opening 106 and secured to the port 104 for the transmission of hydraulic fluid. In FIG. 7, the fitting 102 is shown approaching the port 104, as represented by arrows 170*a*, 170*b*, 170*c*. The first lobe 164*a* (not shown) is aligned with the first lobe recess 115*a*, as no other lobe 164*b*, 164*c* will fit within the first lobe recess 115*a* in this example. The second lobe 164*b* is aligned with the second lobe recess 115*b*. And the third lobe 164*c* is aligned with the third lobe recess 115*c*. It should also be noted that FIG. 7 shows an elastic member 172, which here is an O-ring having a rectangular profile, arranged on the central body 154, longitudinally adjacent to the flange 152.

FIGS. 8A and 8B illustrate a second step in the sequence at which point the head 156 of the fitting 102 contacts the shoulder 116 at the bottom of the first portion 112 of the central opening 106, although no rotation of the fitting 102 relative to the port 104 has yet occurred. In particular, FIG. 8A shows a top view of the not-yet-assembled hydraulic connection 100, with portions of the fitting 102 and the port 104 above the head 156 having been cut away. One having ordinary skill in the art will recognize from FIG. 8A, amongst other figures, that at this point in the assembly—while the head 156 is in contact with the shoulder 116—the shape of the first portion 112 of the central opening 106 allows for clockwise rotation of the fitting 102 relative to the port 104. Further, FIG. 8B shows the head 156 of the fitting 102 in contact with the shoulder 116 of the central opening 106. FIG. 8B also shows how the elastic member 172 beneath the flange 152 must be compressed to bring the head 156 into contact with the shoulder 116. Consequently, the compressed elastic member 172 exerts forces on the flange 152 and the first side 108 of the port 104 that tend to force the fitting 102 and the port 104 apart.

Figure 9A:
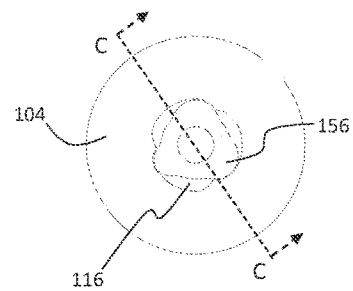
FIG. 9A is a top sectional view of the tamper-resistant hydraulic connection showing the head of the fitting disposed within the port in a third step in the sequence whereby the fitting is secured to the port.
Figure 9B:
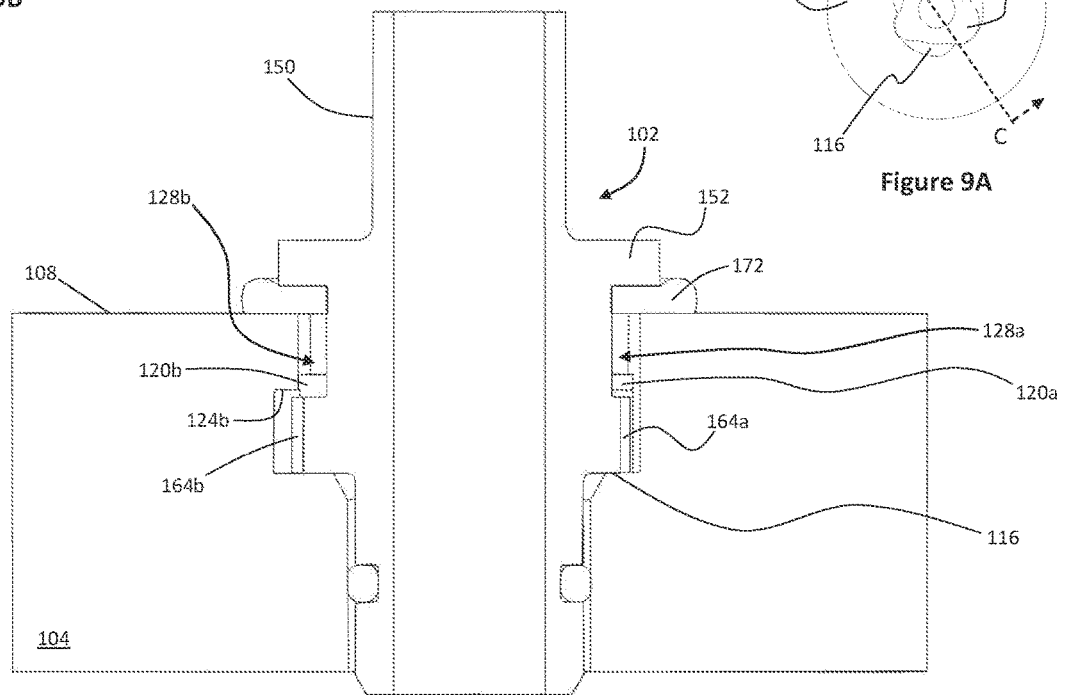
FIG. 9B is a cross-sectional view of the tamper-resistant hydraulic connection illustrating the third step in the sequence whereby the fitting is secured to the port, with the cross-section being taken across line C-C in FIG. 9A.

FIGS. 9A and 9B illustrate a third step in the sequence at which point the fitting 102 and thus the head 156 have been rotated approximately 40 degrees relative to the port 104. This rotation can be seen best by comparing FIG. 9A to FIG. 8A. In some examples, the degree of rotation permitted by the first portion 112 of the central opening 106 is between 35 and 45 degrees. In other examples, the degree of rotation permitted by the first portion of the central opening is between 30 and 50 degrees. In still other examples, the degree of rotation permitted by the first portion of the central opening is between 25 and 55 degrees. Of course, the degree of rotation permitted depends on the shape of the head 156 such that configurations with more protrusions (e.g., star- or pentagonal-shaped heads) are rotated less relative to the port and such that configurations with less protrusions (e.g., an elliptical-shaped head with two poles) may be rotated more. While rotating the fitting 102 relative to the port 104, the first, second, and third lobes 164*a*, 164*b*, 164*c* of the head 156 pass, respectively, under the radially-extending planar surfaces 124*a*, 124*b*, 124*c* of the central opening 106 and eventually come into contact with the sidewalls 130*a*, 130*b*, 130*c* of the respective pockets 120*a*, 120*b*, 120*c*. While rotating the fitting 102, a force must be exerted on the fitting 102 in a longitudinal direction to maintain the compression of the elastic member 172.

Figure 10:
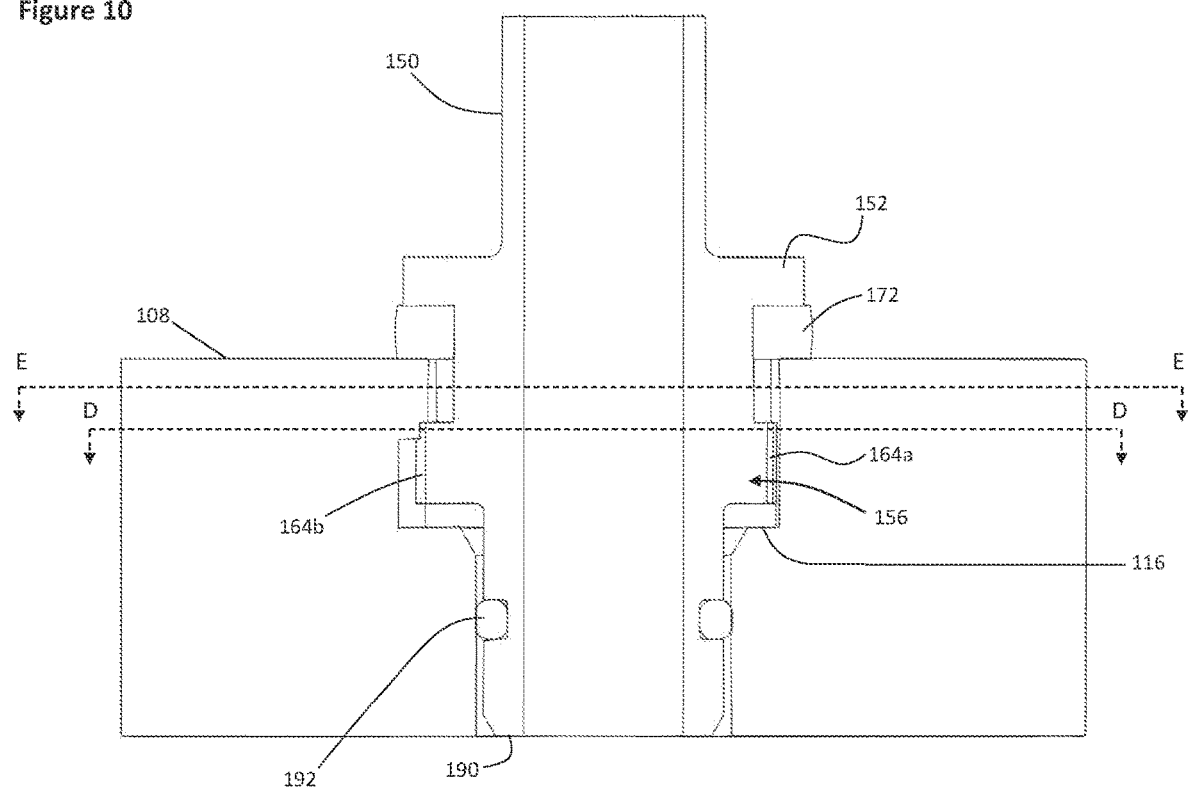
FIG. 10 is a cross-sectional view of the tamper-resistant hydraulic connection illustrating a fourth step in the sequence whereby the fitting is secured to the port.

FIG. 10 shows a fourth and final step in the sequence of assembling the hydraulic connection 100. Once the fitting 102 has been rotated relative to the port 104, the force that is exerted to compress the elastic member 172 in prior steps may be withdrawn. As the elastic member 172 expands, the head 156 of the fitting 102 separates from the shoulder 116 and the lobes 164*a*, 164*b*, 164*c* move up and into the pockets 120*a*, 120*b*, 120*c*. Eventually, pressurizing the hydraulic system of which the hydraulic connection 100 is part exerts pressure on the fitting 102, which prevents the lobes 164*a*, 164*b*, 164*c* from backing longitudinally out of the pockets 120*a*, 120*b*, 120*c*. Specifically, pressure will act on a portion 190 of the fitting 102 that is in the second portion 114 of the central opening 106 and is located below a seal 192. Before pressurizing the hydraulic system, however, as shown in FIG. 10, the elastic member 172 may remain in a slightly compressed state, which in turn prevents the lobes 164*a*, 164*b*, 164*c* from backing longitudinally out of the pockets 120*a*, 120*b*, 120*c*.

Thus, as shown in the cross section in FIG. 11 taken across line D-D in FIG. 10, once the hydraulic connection 100 is assembled, the respective stop 126 and the respective sidewall 130 prevent each lobe 164 from rotating, which is necessary for disassembly of the hydraulic connection 100. The elastic member 172 and, eventually, hydraulic pressure present in the system prevent the head 156 and its lobes 164 from retreating longitudinally from the pockets 120. Meanwhile, the overhangs 128 of the port 104 prevent the head 156 and thus the fitting 102 from retreating from the central opening 106, as illustrated by the cross section in FIG. 12 taken across line E-E in FIG. 10.

FIG. 13 shows the example port 104, half of which has been cut away for illustration purposes. FIG. 13 also shows a path 200 that the lobe 164a takes during assembly of the hydraulic connection 100. The path 200 indicates how the lobe 164a of the head 156 is brought down to the shoulder 116 of the central opening 106, is rotated underneath the radially-extending planar surface 124a, and is then separated from the shoulder 116 and positioned up into the pocket 120a. Once in place, the overhang 128a, the sidewall 130a, the stop 126a, the elastic member 172, and hydraulic pressure all cooperate to retain the lobe 164a in place. One having ordinary skill in the art would recognize that the other lobes 164b, 164c follow similar paths during assembly.

What is claimed is:

1. A tamper-resistant hydraulic connection comprising:
    a fitting that includes:
        a passage that extends longitudinally for transmitting hydraulic fluid,
        a flange,
        a head that is longitudinally spaced apart from the flange, and
        a central body disposed longitudinally between the head and the flange, wherein the head includes a plurality of lobes that protrude radially relative to the central body;
    a port that includes a central opening that extends longitudinally and is configured to transmit hydraulic fluid, wherein the lobes of the head are configured to be retained in respective pockets within the central opening, wherein the pockets are configured to prevent the head from rotating and are configured to prevent the head from retreating from the central opening, wherein the fitting and the port are configured to create a fluid-tight connection; and
    an elastic member that is configured to be compressed longitudinally between the flange of the fitting and the port when the tamper-resistant hydraulic connection is fully assembled;
    wherein a first of the lobes has a different profile than a second and a third of the lobes such that the fitting can only be inserted into the central opening of the port at a single angular position relative to the port;
    wherein the profile of the first of the lobes has a different radius of curvature than the second and the third of the lobes.

2. The tamper-resistant hydraulic connection of claim 1 wherein the fitting and the port are configured such that the elastic member is compressed to a first extent during assembly and to a second extent when the tamper-resistant hydraulic connection is fully assembled, wherein the first extent of compression is greater than the second extent of compression.

3. The tamper-resistant hydraulic connection of claim 1 wherein the flange, the central body, and the head are disposed longitudinally between a first tubular portion and a second tubular portion of the fitting, wherein the head is configured to be inserted into a first portion of the central opening, wherein the second tubular portion of the fitting is configured to be inserted farther into the central opening into a second portion of the central opening, wherein the first tubular portion is configured to be attached to a hose that transmits hydraulic fluid.

4. The tamper-resistant hydraulic connection of claim 1 wherein the head of the fitting is configured to be inserted into a first portion of the central opening of the port where the head is ultimately retained, with a cross-sectional profile of the head matching a cross-sectional profile of the central opening across only part of a longitudinal extent of the first portion of the central opening.

5. The tamper-resistant hydraulic connection of claim 4 wherein the fitting and the port are configured such that the head rotates in a first radially-extending plane within the central opening, wherein the fitting and the port are configured such that the lobes are retained within the pockets in the central opening at a second radially-extending plane that is longitudinally spaced apart from the first radially-extending plane.

6. The tamper-resistant hydraulic connection of claim 5 wherein the central opening of the port is configured to permit rotation of the head of the fitting only at the first radially-extending plane while the head is inserted within the central opening.

* * * * *